(12) United States Patent
Hosseini et al.

(10) Patent No.: US 12,207,257 B2
(45) Date of Patent: Jan. 21, 2025

(54) SIDELINK RESOURCE RESERVATION AND SELECTION

(71) Applicant: QUALCOMM Incorporated, San Diego, CA (US)

(72) Inventors: Seyedkianoush Hosseini, San Diego, CA (US); Gokul Sridharan, Sunnyvale, CA (US); Peter Gaal, San Diego, CA (US); Wanshi Chen, San Diego, CA (US); Gabi Sarkis, San Diego, CA (US); Wei Yang, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 17/444,267

(22) Filed: Aug. 2, 2021

(65) Prior Publication Data
US 2023/0031258 A1  Feb. 2, 2023

(51) Int. Cl.
*H04W 72/20* (2023.01)
*H04W 28/26* (2009.01)

(52) U.S. Cl.
CPC .......... *H04W 72/20* (2023.01); *H04W 28/26* (2013.01)

(58) Field of Classification Search
None
See application file for complete search history.

(56) References Cited

U.S. PATENT DOCUMENTS 10,419,175 B2 * 9/2019 Kim ................ H04L 5/0037
2017/0019886 A1 * 1/2017 Patel ................ H04W 72/23
2017/0027013 A1 * 1/2017 Kim ................ H04W 52/383
2017/0353947 A1 * 12/2017 Ang ................ H04L 5/0048
2019/0159223 A1 * 5/2019 Park ................ H04W 24/08
2019/0182827 A1 * 6/2019 Wang ............... H04W 72/20
2019/0306923 A1 * 10/2019 Xiong .............. H04J 13/0062
2019/0313419 A1 * 10/2019 Fakoorian ........ H04L 5/0055
2019/0363843 A1 * 11/2019 Gordaychik ........... H04L 1/08
2020/0037347 A1 * 1/2020 Yang ................ H04L 5/0051
2020/0077402 A1 * 3/2020 Lei ................... H04L 1/0003
(Continued)

FOREIGN PATENT DOCUMENTS

WO  WO-2021028387 A1  2/2021

OTHER PUBLICATIONS

Bazzi et al., On the Design of Sidelink for Cellular V2X: A Literature Review and Outlook for Future, Jul. 2021, IEEE Access, vol. 9, pp. 97953-97980. (Year: 2021).*

(Continued)

*Primary Examiner* — Nicholas Sloms
(74) *Attorney, Agent, or Firm* — Harrity & Harrity, LLP

(57) ABSTRACT

Various aspects of the present disclosure generally relate to wireless communication. In some aspects, a network node may receive information indicating a reservation or allocation of a resource for transmission of a first signal by another network node, wherein the information identifies whether the network node is to use the resource for transmission of a second signal concurrently with the first signal. The network node may transmit the second signal in the resource based at least in part on the information identifying whether the network node is to use the resource for transmission of the second signal. Numerous other aspects are described.

30 Claims, 10 Drawing Sheets

(56) References Cited

U.S. PATENT DOCUMENTS

| | | | | |
|---|---|---|---|---|
| 2020/0106566 A1* | 4/2020 | Yeo | | H04W 28/04 |
| 2020/0229117 A1* | 7/2020 | Abedini | | H04B 7/088 |
| 2020/0229173 A1* | 7/2020 | Cao | | H04W 72/044 |
| 2020/0236667 A1* | 7/2020 | Kwak | | H04W 72/20 |
| 2020/0304159 A1* | 9/2020 | Liao | | H04J 11/0036 |
| 2021/0051525 A1* | 2/2021 | Cao | | H04W 72/02 |
| 2021/0099986 A1* | 4/2021 | Lu | | H04L 5/0091 |
| 2021/0345360 A1* | 11/2021 | Yeo | | H04W 72/20 |
| 2021/0368351 A1* | 11/2021 | Cui | | H04W 74/002 |

OTHER PUBLICATIONS

Ericsson, Details on Physical Layer Structure for SL V2X, Jan. 2019, 3GPP TSG-RAN WG1 Meeting #ah-1901, R1-1901211, pp. 1-13. (Year: 2019).*

Huawei, et al., "Sidelink Physical Layer Structure for NR V2X", 3GPP TSG RAN WG1 Meeting #99, R1-1911882, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, XP051823064, 35 Pages, Common and Dedicated Resource Pools, p. 4, Paragraph 2.3-p. 5, Figure 2, p. 19.

International Search Report and Written Opinion—PCT/US2022/073107—ISA/EPO—Sep. 26, 2022.

Samsung: "On Physical Layer Procedures for NR V2X", 3GPP TSG RAN WG1 Ad-Hoc Meeting 1901, R1-1901048, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, 11 Pages, Jan. 11, 2019, XP051576582, Paragraph [0004]-Paragraph [0005], pp. 5-6.

* cited by examiner

SIDELINK RESOURCE RESERVATION AND SELECTION

FIELD OF THE DISCLOSURE

Aspects of the present disclosure generally relate to wireless communication and to techniques and apparatuses for sidelink resource reservation and selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include receiving information indicating a reservation or allocation of a resource for transmission of a first signal by another network node, wherein the information identifies whether the network node is to use the resource for transmission of a second signal concurrently with the first signal. The method may include transmitting the second signal in the resource based at least in part on the information identifying whether the network node is to use the resource for transmission of the second signal.

Some aspects described herein relate to a method of wireless communication performed by a network node. The method may include receiving information indicating a reservation or allocation of a resource for transmission of a first signal by a first transmitting network node, wherein the information identifies whether a second transmitting network node is to use the resource for transmission of a second signal concurrently with the first signal. The method may include receiving the second signal in the resource based at least in part on the information identifying whether the second transmitting network node is to use the resource for transmission of the second signal.

Some aspects described herein relate to a network node for wireless communication. The network node may include a memory and one or more processors coupled to the memory. The one or more processors may be configured to receive information indicating a reservation or allocation of a resource for transmission of a first signal by another network node, wherein the information identifies whether the network node is to use the resource for transmission of a second signal concurrently with the first signal. The one or more processors may be configured to transmit the second signal in the resource based at least in part on the information identifying whether the network node is to use the resource for transmission of the second signal.

Some aspects described herein relate to a network node for wireless communication. The network node may include a memory and one or more processors coupled to the memory. The one or more processors may be configured to receive information indicating a reservation or allocation of a resource for transmission of a first signal by a first transmitting network node, wherein the information identifies whether a second transmitting network node is to use the resource for transmission of a second signal concurrently with the first signal. The one or more processors may be configured to receive the second signal in the resource based at least in part on the information identifying whether the second transmitting network node is to use the resource for transmission of the second signal.

Some aspects described herein relate to a non-transitory computer-readable medium that stores a set of instructions for wireless communication by a network node. The set of instructions, when executed by one or more processors of the network node, may cause the network node to receive information indicating a reservation or allocation of a resource for transmission of a first signal by another network node, wherein the information identifies whether the network node is to use the resource for transmission of a second signal concurrently with the first signal. The set of instructions, when executed by one or more processors of the network node, may cause the network node to transmit the second signal in the resource based at least in part on the information identifying whether the network node is to use the resource for transmission of the second signal.

Some aspects described herein relate to a non-transitory computer-readable medium that stores a set of instructions for wireless communication by a network node. The set of instructions, when executed by one or more processors of the network node, may cause the network node to receive information indicating a reservation or allocation of a resource for transmission of a first signal by a first transmitting network node, wherein the information identifies whether a second transmitting network node is to use the resource for transmission of a second signal concurrently with the first signal. The set of instructions, when executed by one or more processors of the network node, may cause the network node to receive the second signal in the resource based at least in part on the information identifying whether the second transmitting network node is to use the resource for transmission of the second signal.

Some aspects described herein relate to an apparatus for wireless communication. The apparatus may include means for receiving information indicating a reservation or allocation of a resource for transmission of a first signal by a network node, wherein the information identifies whether the apparatus is to use the resource for transmission of a second signal concurrently with the first signal. The apparatus may include means for transmitting the second signal in the resource based at least in part on the information identifying whether the apparatus is to use the resource for transmission of the second signal.

Some aspects described herein relate to an apparatus for wireless communication. The apparatus may include means for receiving information indicating a reservation or allocation of a resource for transmission of a first signal by a first transmitting network node, wherein the information identifies whether a second transmitting network node is to use the resource for transmission of a second signal concurrently with the first signal. The apparatus may include means for receiving the second signal in the resource based at least in part on the information identifying whether the second transmitting network node is to use the resource for transmission of the second signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
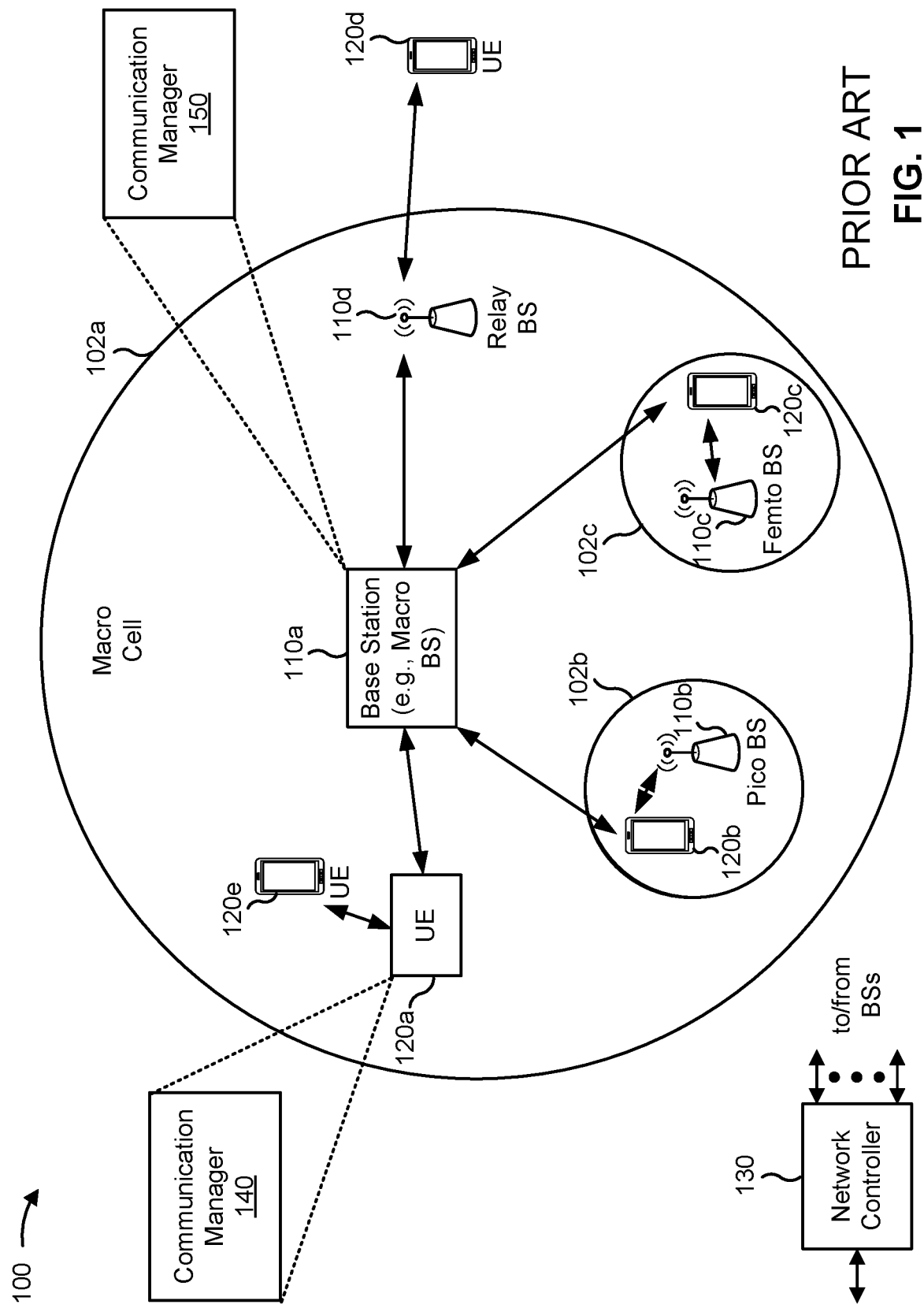
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node may include a communication manager 140 or a communication manager 150. As described in more detail elsewhere herein, the communication manager 140 or 150 may receive information indicating a reservation or allocation of a resource for transmission of a first signal by another network node, wherein the information identifies whether the network node is to use the resource for transmission of a second signal concurrently with the first signal; and transmit the second signal in the resource based at least in part on the information identifying whether the network node is to use the resource for transmission of the second signal. Additionally, or alternatively, the communication manager 140 or 150 may perform one or more other operations described herein.

In some aspects, a network node may include a communication manager 140. As described in more detail elsewhere herein, the communication manager 140 may receive information indicating a reservation or allocation of a resource for transmission of a first signal by a first transmitting network node, wherein the information identifies whether a second transmitting network node is to use the resource for transmission of a second signal concurrently with the first signal; and receive the second signal in the resource based at least in part on the information identifying whether the second transmitting network node is to use the resource for transmission of the second signal. Additionally, or alternatively, the communication manager 140 may perform one or more other operations described herein.

As indicated above, FIG. 1 is provided as an example. Other examples may differ from what is described with regard to FIG. 1.

Figure 2:
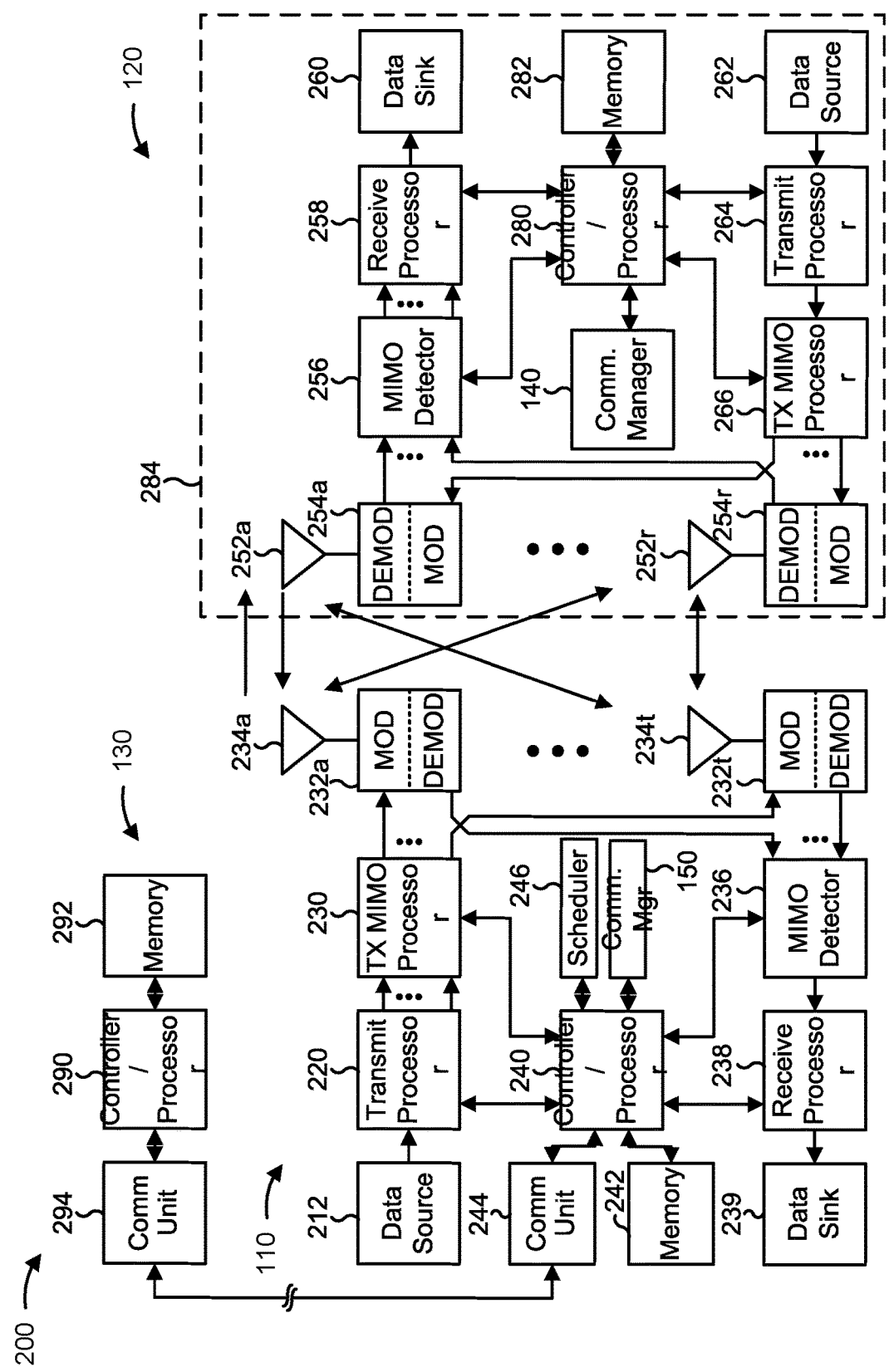
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with sidelink resource reservation and selection, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. In some aspects, the network node described herein is the base station 110 or the UE 120, is included in the base station 110 or the UE 120, or includes one or more components of the base station 110 or the UE 120 shown in FIG. 2. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a network node (e.g., the base station 110 or the UE 120) includes means for receiving information indicating a reservation or allocation of a resource for transmission of a first signal by another network node, wherein the information identifies whether the network node is to use the resource for transmission of a second signal concurrently with the first signal; and/or means for transmitting the second signal in the resource based at least in part on the information identifying whether the network node is to use the resource for transmission of the second signal. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the network node to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the UE 120) includes means for receiving information indicating a reservation or allocation of a resource for transmission of a first signal by a first transmitting network node, wherein the information identifies whether a second transmitting network node is to use the resource for transmission of a second signal concurrently with the first signal; and/or means for receiving the second signal in the resource based at least in part on the information identifying whether the second transmitting network node is to use the resource for transmission of the second signal. In some aspects, the means for the network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
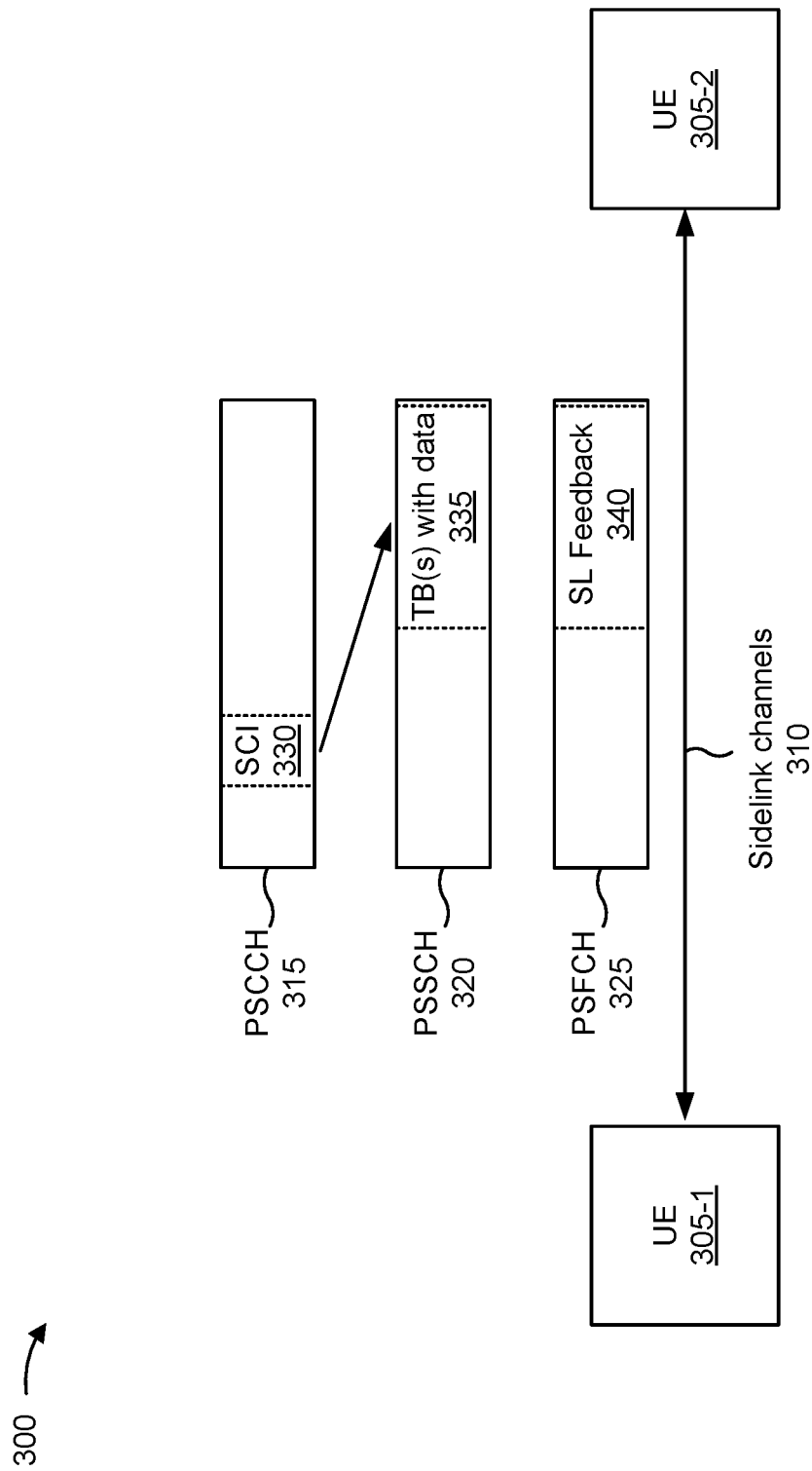
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. The one or more sidelink channels 310 may use a PC5 interface and/or may operate in a high frequency band (e.g., the 5.9 GHz band). The UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. A UE 305 may transmit the PSSCH 320 with up to 2 layers (e.g., antennas) and may use a modulation and coding scheme (MCS), such as quadrature phase shift keying (QPSK) or quadrature amplitude modulation (QAM) (e.g., 16-QAM, 64-QAM, or 256-QAM). A precoding matrix for the PSSCH 320 may be an identity matrix. The PSSCH 320 may be scrambled using a scrambling sequence associated with a cyclic redundancy check (CRC). A UE 305 may support full-duplex (FD) orthogonal cover codes (OCCs) (FD-OCCs) for the PSSCH 320. More details regarding a PSSCH are described in 3GPP Technical Specification (TS) release 16, version 16.6.0, section 7.3.2. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). In some cases, the PSSCH DMRS pattern may be based at least in part on a resource pool associated with the PSSCH 320, and up to 3 DMRS patterns may be configured for the PSSCH 320. In some cases, a UE 305 may support DMRSs with 2, 3, or 4 symbols and may support only a single code division multiplexing (CDM) group. More details regarding a PSSCH DMRS pattern are described in 3GPP TS 38.211, release 16, version 16.6.0, section 8.4.1.1.2. The SCI-2 may include information associated with data transmissions on the PSSCH 320, such as a HARQ process ID, a new data indicator (NDI), a source identifier, a destination identifier, and/or a channel state information (CSI) report trigger.

The one or more sidelink channels 310 may use resource pools. For example, a scheduling assignment (e.g., included in SCI 330) may be transmitted in sub-channels using specific resource blocks (RBs) across time. Data transmissions (e.g., on the PSSCH 320) associated with a scheduling assignment may occupy adjacent RBs in the same subframe as the scheduling assignment (e.g., using frequency division multiplexing). A scheduling assignment and associated data transmissions are not transmitted on adjacent RBs.

In some cases, a UE 305 may operate using a transmission mode where resource selection and/or scheduling is performed by a base station 110. For example, in mode 1 resource allocation, a base station schedules or configures sidelink resources and transmits information identifying the scheduling or configuration of the sidelink resources to a UE 305. Mode 1 resource allocation may include a type 1 allocation, in which the base station 110 uses radio resource control (RRC) signaling to convey information about sidelink resources, or a type 2 allocation, in which the base station 110 uses RRC signaling to configure sidelink resources and dynamic signaling to activate the configured sidelink resources.

In some cases, a UE 305 may operate using a transmission mode where resource selection and/or scheduling is performed by the UE 305 (e.g., rather than a base station 110). For example, in mode 2 resource allocation, the UE 305 may perform resource selection and/or scheduling by sensing channel availability for transmissions, as described in more detail herein. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
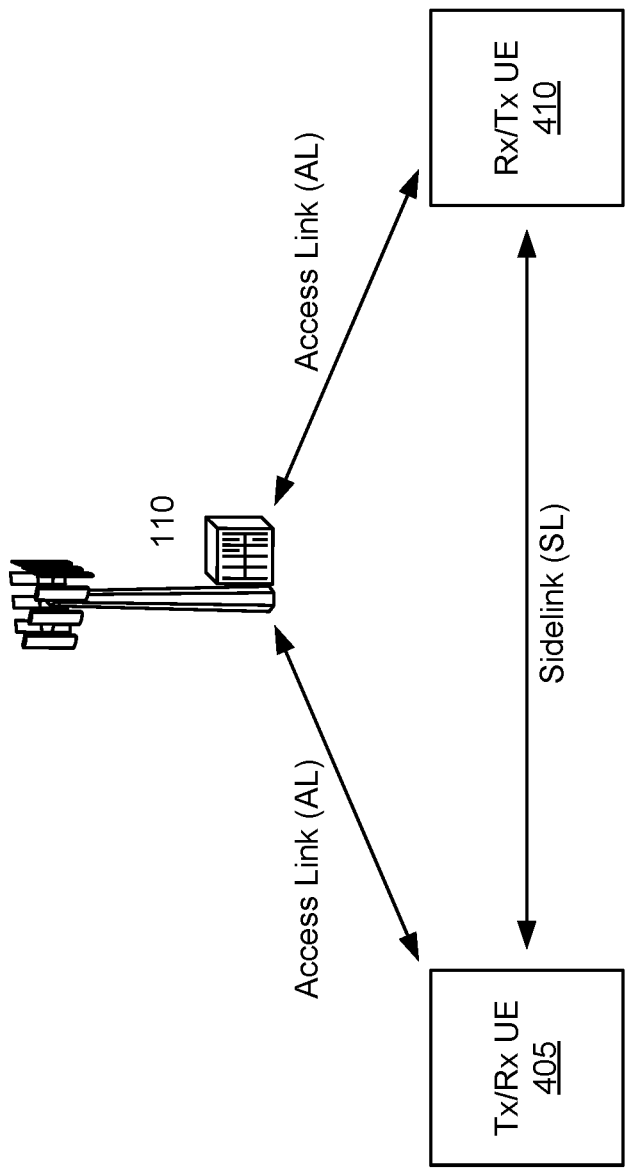
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. For example, in mode 1 resource allocation, the base station 110 may use the first access link to communicate information identifying a configuration of sidelink resources. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
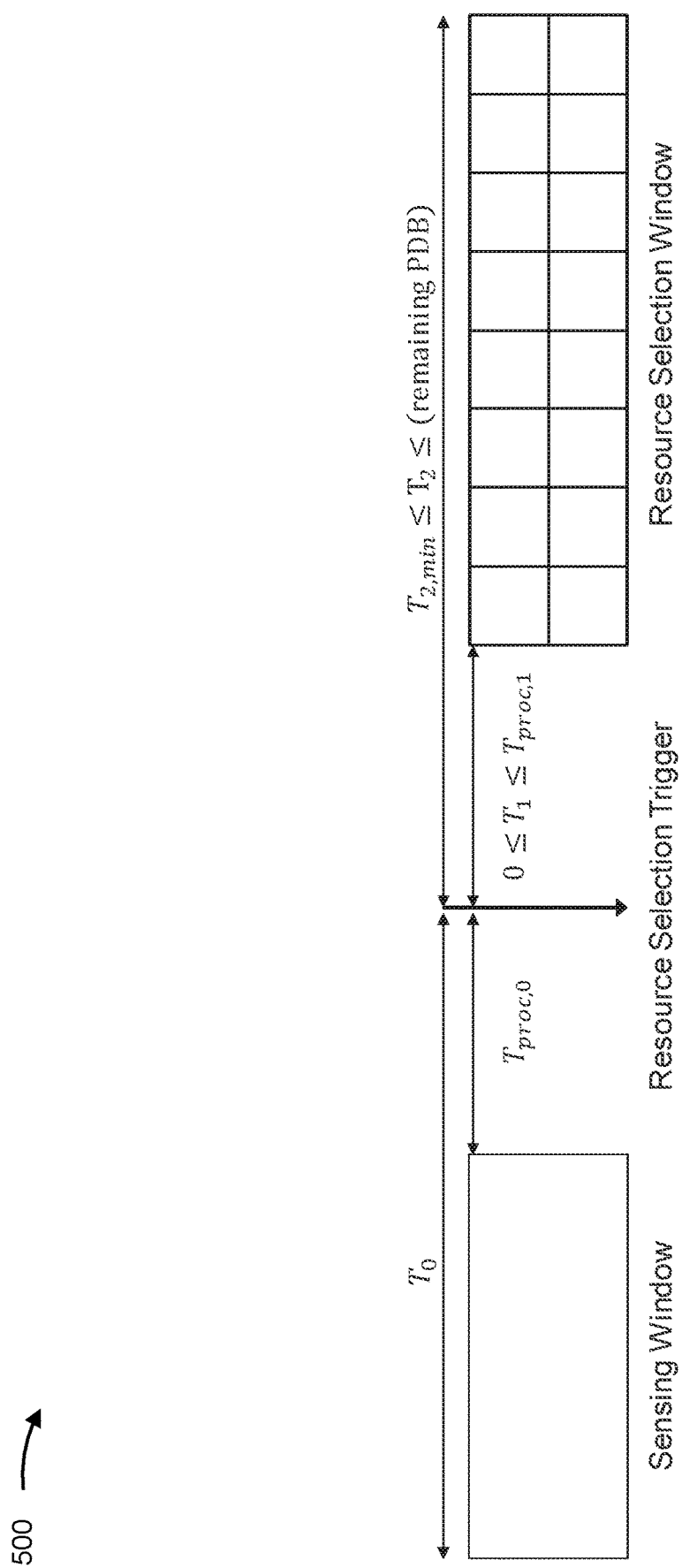
FIG. 5 is a diagram illustrating an example of resource selection using a sensing procedure, in accordance with the present disclosure

FIG. 5 is a diagram illustrating an example 500 of resource selection using a sensing procedure, in accordance with the present disclosure.

As shown in FIG. 5, a UE, such as the UE 120 of FIG. 2, may use a sensing procedure to select resources for sidelink communication, such as described above in connection with FIG. 3. For example, a UE configured for communication in an NR network may perform the sensing procedure of example 500.

As shown in FIG. 5, a UE may perform a sensing procedure in a sensing window. In some cases, the sensing window may be 100 milliseconds (ms) (e.g., for aperiodic resource reservation, such as aperiodic reservation in one or more slots of up to 32 logical slots in the future) or 1100 ms (e.g., for periodic resource reservation). In some cases, a UE configured for communication in an NR network may use a sensing procedure for aperiodic or periodic resource reservation.

According to the sensing procedure, the UE may decode control messages (e.g., SCI) relating to resource reservations of other UEs, as well as perform measurements (e.g., RSRP measurements) associated with one or more sidelink channels. For example, UEs may transmit reservation information (e.g., in SCI) that indicates a resource reservation for a current slot (e.g., the slot in which the reservation information is transmitted) and for one or more (e.g., up to two, or another threshold value that may be defined) future slots. A resource allocation associated with a resource reservation may be one or more sub-channels in a frequency domain and one slot in a time domain. In periodic resource reservation, a UE may signal (e.g., in the reservation information in SCI) a period for the resource reservation (e.g., a value between 0 ms and 1000 ms). Periodic resource reservation may be disabled by configuration in some UEs.

As shown in FIG. 5, the UE may determine to select resources for a sidelink communication based at least in part on a resource selection trigger. For example, resource selection may be triggered when the UE has a packet that is to be transmitted. Based at least in part on the resource selection trigger, the UE may determine one or more resources that are available for selection in a resource selection window. That is, the UE may determine the one or more available resources based at least in part on the sensing procedure performed by the UE. For example, the sensing procedure may provide an indication of resources in the resource selection window that are occupied and/or resources in the resource selection window associated with high interference.

In some cases, if a resource selection trigger occurs in a subframe n, the resource selection window is from n+T1 to n+T2. In this case, T1 may be less than a processing time (Tproc,1). T2 may be greater than or equal to T2,min, which may be a value configured for the UE based at least in part on a priority of the UE and a subcarrier spacing (SCS) configured for communication, and less than or equal to a remaining packet delay budget (PDB) of the UE.

As indicated above, FIG. 5 is provided as an example. Other examples may differ from what is described with respect to FIG. 5.

In mode 1 and mode 2 resource allocation, a sidelink transmitting (SL TX) UE can transmit a transport block to a single sidelink receiving (SL RX) UE (e.g., using unicast transmission) or multiple SL RX UEs (e.g., using groupcast transmission or broadcast transmission). When the SL TX UE is to transmit a first transport block to a first SL RX UE and a second, different transport block to a second SL RX UE, the SL TX UE may use a larger allocation of resources than when the SL TX UE is transmitting a single transport block. In mode 2 resource allocation, when a resource is assigned to a first SL TX UE for transmission, the resource can be re-assigned to a second SL TX UE if one or more criteria are satisfied, such as the second SL TX UEs being a threshold distance (i.e., satisfying a distance threshold) away from the first SL TX UE (e.g., such that interference is less than an interference threshold). Similarly, in mode 1 resource allocation, abase station may configure the same set of resources for multiple SL TX UEs when the base station determines that the multiple SL TX UEs will not cause a threshold level of interference (e.g., the base station determines that the distance threshold is satisfied or interference mitigation is possible).

The interference threshold may be based on a level of interference that can be managed by an SL RX UE. In other words, the greater a capability of the SL RX UE to perform interference mitigation and successfully decode a transmission that is being interfered with by other transmissions on the same set of resources, the more the same set of resources can be reused by other SL TX UEs to transmit (or the same SL TX UE to transmit other transport blocks to other SL RX UEs). Some techniques have proposed using multiple-user (MU) multiple-input multiple-output (MIMO) (MU-MIMO) transmission to enable greater reuse of a set of resources. In MU-MIMO, different transmissions, on the same set of resources, may be spatially distributed, which enables signal processing that allows an SL RX UE to successfully receive a transmission, despite other transmissions occurring on the same set of resources.

In orthogonal MIMO, when an SL RX UE receives an intended signal and interference via orthogonal ports (e.g., in a time, frequency, or code domain), the SL RX UE may detect an intended signal (e.g., a PSSCH from an intended SL TX UE) and an interfering signal (e.g., another PSSCH from an interfering SL TX UE). By detecting the respective signals, the SL RX UE may obtain DMRS sequences for each SL TX UE based at least in part on the DMRS sequences being based at least in part on a CRC of the respective signals (e.g., CRCs of the PSSCHs). In this case, using the DMRS sequences, the SL RX UE may perform interference nulling. By using MIMO transmission, a single SL TX UE can transmit different transport blocks to different SL RX UEs, concurrently, or multiple SL TX UEs can transmit different transport blocks to different SL RX UEs concurrently, and the multiple SL TX UEs can decode respective transmissions successfully.

However, an SL TX UE may lack information regarding a configuration or capability of an SL RX UE. For example, the SL TX UE may lack information indicating a quantity of receive antennas of the SL RX UE. Without information about the configuration or capability of the SL RX UE, the SL TX UE may be unable to determine whether reuse of a reserved, scheduled, or allocated resource is possible (e.g., with the SL RX UE will be able to perform interference nulling to receive an intended transmission in the presence of an interfering transmission). Similarly, an SL RX UE may lack information to determine whether a resource will be reused and, thus, whether an interfering transmission will be present on a resource. Without information indicating that an interfering transmission will be present, the SL RX UE may not perform interference nulling, which may result in the SL RX UE being unsuccessful at decoding an intended transmission in the resource.

Some aspects described herein enable sidelink resource reservation and selection. For example, when an SL TX UE is to make a reservation of a resource, the SL TX UE may indicate a DMRS pattern and information about a configuration of the SL TX UE in SCI that the SL TX UE transmits to make the reservation of the resource. An SL RX UE may use the information regarding the DMRS pattern and the configuration of the SL TX UE to determine whether a reserved resource is to be reused. When the SL TX UE determines that a reserved resource is to be reused, the SL TX UE may perform interference nulling on the resource to enable the SL TX UE to successfully decode a transmission from the SL TX UE. Moreover, the SL TX UE may configure the transmission based at least in part on whether the resource is to be reused, such as by configuring a DMRS pattern selection based at least in part on whether the resource is to be reused. In this way, the SL TX UE improves a likelihood of successful decoding by the SL RX UE in a resource reuse scenario.

Figure 6:
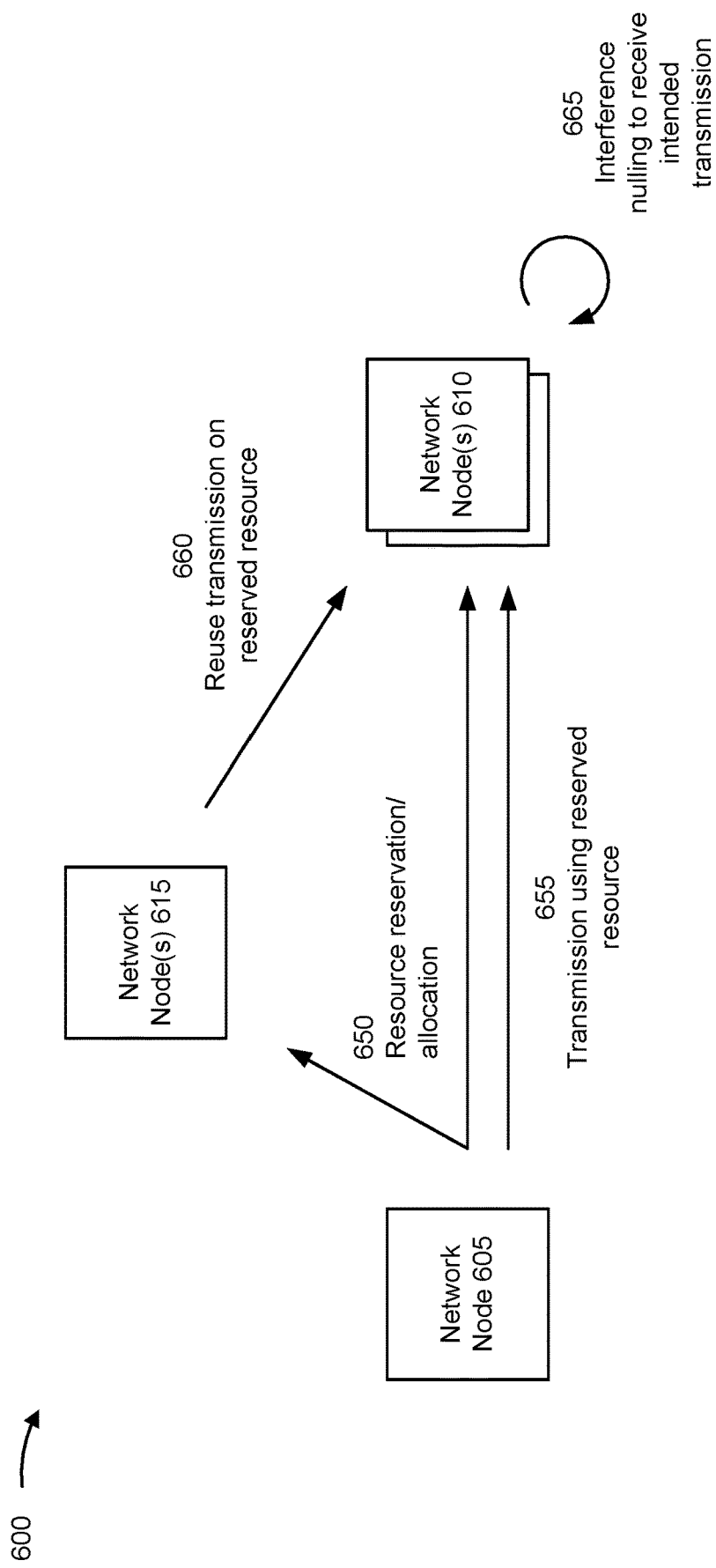
FIG. 6 is a diagram illustrating an example associated with sidelink resource reservation and selection, in accordance with the present disclosure

FIG. 6 is a diagram illustrating an example 600 associated with sidelink resource reservation and selection, in accordance with the present disclosure. As shown in FIG. 6, example 600 includes communication between a set of network nodes (e.g., network node 605, one or more network nodes 610, and one or more network nodes 615). In some aspects, the network nodes may be included in a wireless network, such as wireless network 100.

As further shown in FIG. 6, and by reference number 650, network node 605 may transmit information identifying a resource reservation or allocation. For example, network node 605 may be a UE (e.g., a UE 120) that transmits SCI to reserve a resource for transmission of a first signal. In this case, network node 605 may transmit information identifying a DMRS configuration that network node 605 is to use to transmit the first signal. The DMRS configuration may include information identifying a DMRS pattern, such as information identifying a quantity of DMRS symbols, a DMRS type, or a location of the DMRS symbols within a resource allocation, among other examples. Additionally, or alternatively, the network node 605 may transmit code division multiplexing (CDM) information, such as a quantity of CDM groups, a quantity of ports that are to be used for transmission, an index of the CDM groups or the ports, or an index of other CDM groups or ports (e.g., that are not being used for transmission and can be used by other network nodes, such as network nodes 615 when reusing the resource for transmission of one or more signal signals), among other examples. In this way, by identifying a first DMRS pattern that is to be used for transmission of a first signal in a resource, other network nodes 615 that are to reuse the resource for transmission of a second signal can select a second DMRS pattern, such that there is no collision (e.g., overlap) between a DMRS transmission and a data transmission, which may improve interference estimation and interference nulling.

Additionally, or alternatively, network node 605 may identify a resource allocation to a set of network nodes 615. For example, when network node 605 is a scheduling entity (e.g., a base station 110 or a UE 120 that is a relay for a base station 110), network node 605 may indicate that a first network node 615 is to transmit a first signal with a resource and a second network node 615 is to transmit a second signal with the resource (e.g., a reuse of the resource).

As further shown in FIG. 6, and by reference numbers 655 and 660, one or more network nodes, such as network node 605 and/or one or more network nodes 615, may transmit using the resource reservation or allocation. For example, network node 605 may transmit a first signal (e.g., a PSCCH or PSSCH) using a resource and a network node 615 may reuse the resource for transmission of a second signal (e.g., another PSCCH or PSSCH). Additionally, or alternatively, a first network node 615 may transmit a first signal using the resource and a second network node 615 may transmit a second signal as a reuse of the resource. Additionally, or alternatively, a single network node (e.g., a single network node 605 or 615) may transmit multiple different signals using the resource, such as a first transport block as a first signal and a second transport block as a second signal (e.g., to the same or different network nodes 610).

In some aspects, a network node 615 may determine to transmit on a resource used by another network node (e.g., network node 605 or another network node 615). For example, network node 615 may determine to transmit using MU-MIMO on the same resource as network node 605. In some aspects, different network nodes may select different DMRS patterns. For example, network node 605 may select a first DMRS pattern, from a set of DMRS patterns available for a resource pool that includes the resource, for transmission of a first signal in the resource, and network node 615 may select a second DMRS pattern, from the set of DMRS patterns, for transmission of a second signal in the resource.

In this case, the second DMRS pattern is selected such that there is not overlap between DMRS symbols and data symbols to enable interference nulling by a network node 610. For example, network node 615 may select a second DMRS pattern with a full overlap with the first DMRS pattern (e.g., all DMRS symbols are at the same resources). Additionally, or alternatively, network node 615 may select a second DMRS pattern with at least a partial overlap with the first DMRS pattern (e.g., one or more DMRS symbols of the second DMRS pattern are at the same resources as for the first DMRS pattern). In the partial overlap case, network node 610 may be configured with a rule for determining which resources have the overlap between DMRS patterns to enable interference channel estimation and interference nulling (e.g., a first symbol may have overlap, a first two symbols may have overlap, etc.). In both the full overlap and partial overlap cases, a network node 610 may receive a first DMRS of the first DMRS pattern and a second DMRS of the second DMRS pattern concurrently, thereby enabling interference channel estimation and interference nulling, as described herein. In some aspects, network node 615 and, for example, network node 605, may use different combs for the DMRS patterns. For example, network node 605 may use a first comb for a first DMRS pattern and network node 615 may use a second comb for a second DMRS pattern, thereby enabling randomization for the DMRS patterns, which enables interference channel estimation and interference nulling. "DMRS comb" refers to a technique for achieving orthogonality associated with frequency division multiplexing. Additionally, or alternatively, network nodes 605/615 may use different FD-OCCs for transmission of different signals. For example, network node 615 may select a second FD-OCC based at least in part on a first FD-OCC selected and indicated by network node 605. By using different OCCs (e.g., FD-OCCs), network nodes 605/615 provide orthogonality between the first signal and the second signal to enable interference channel estimation and interference nulling. Additionally, or alternatively, network node 605 may select a first FD-OCC based at least in part on a first selection rule (e.g., selecting, for the resource for transmission, the same FD-OCC that was selected in a prior resource used for the SCI reserving the resource for transmission) and network node 615 may select a second FD-OCC based at least in part on a second selection rule (e.g., a sequentially next indexed FD-OCC after the first FD-OCC or a random FD-OCC that is not the first FD-OCC). Additionally, or alternatively, network node 605 may indicate which FD-OCC is to be used by one or more network nodes 615. The one or more network nodes 615 may use the FD-OCC for transmission of a PSCCH.

In some aspects, network node 615 may receive information identifying a DMRS pattern. For example, when network node 605 is a scheduling entity (e.g., a base station 110 or another UE 120 that is a relay for a base station 110), network node 605 may provide information to the one or more network nodes 615 indicating one or more DMRS patterns to use for concurrent transmission of multiple signals on the resource.

In some aspects, network node 615 and/or network node 605 may initialize a DMRS sequence to provide randomness for interference channel estimation and interference nulling. For example, network node 615 may be configured and/or may receive a parameter c_init (e.g., received from network node 605) indicating a starting point for initializing a DMRS sequence. Additionally, or alternatively, network node 605 may initialize the DMRS sequence and indicate the initialized DMRS sequence to network node 615. In some aspects, the DMRS sequence may be based at least in part on other parameters. For example, network node 615 may determine c_init based at least in part on a source identifier, a destination identifier, whether HARQ feedback is enabled, a zone identifier, or a cast type (e.g., unicast, broadcast, or groupcast), among other examples.

As further shown in FIG. 6, and by reference number 665, a network node 610 may perform interference channel estimation and interference nulling to receive an intended transmission. For example, network node 610 may receive DMRSs associated with an intended signal and an interfering signal, and may use the DMRSs for interference channel estimation and interference nulling (e.g., based at least in part on orthogonality of the DMRSs).

As indicated above, FIG. 6 is provided as an example. Other examples may differ from what is described with respect to FIG. 6.

Figure 7:
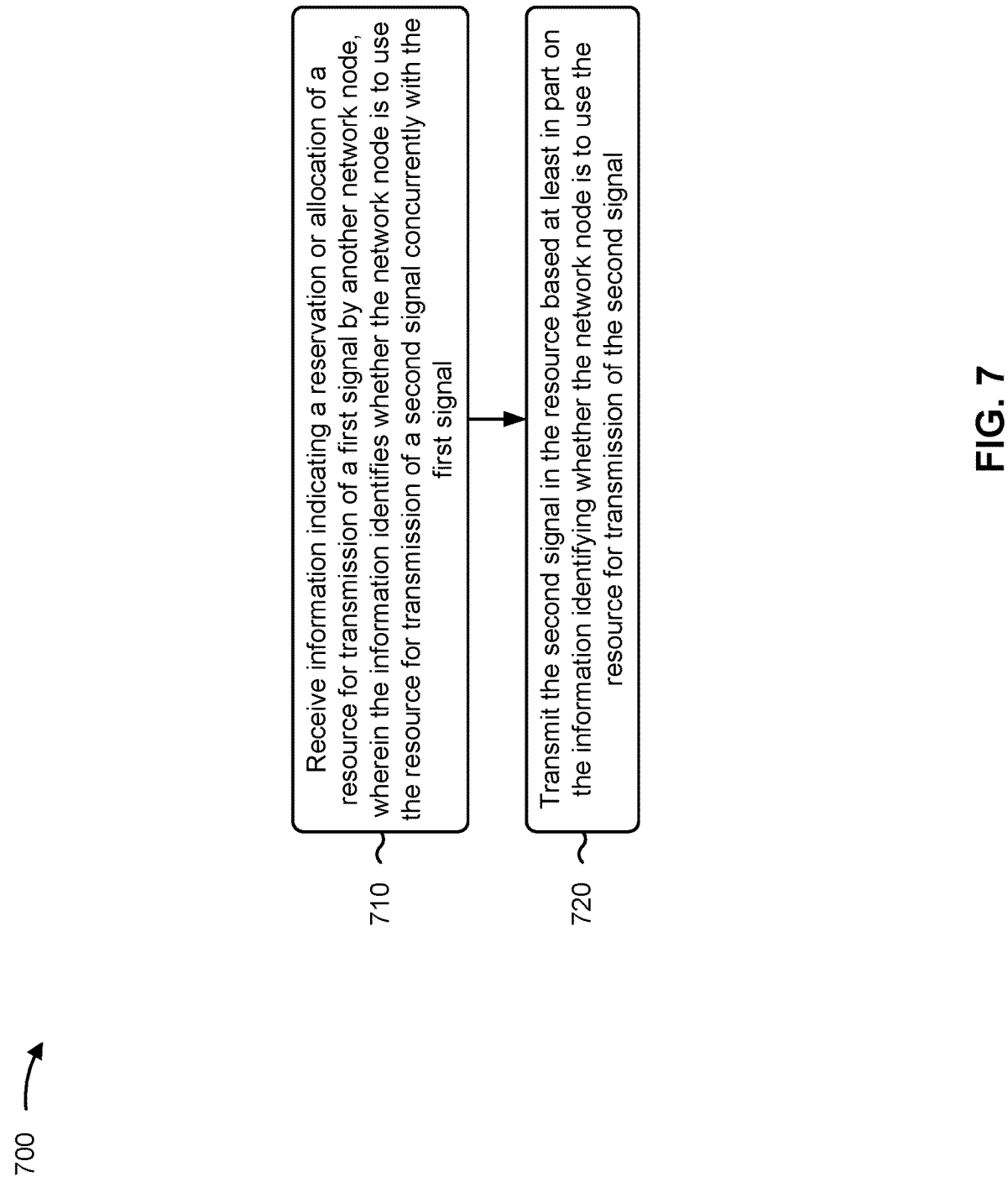
FIGS. 7-8 are diagrams illustrating example processes associated with sidelink resource reservation and selection, in accordance with the present disclosure.

FIG. 7 is a diagram illustrating an example process 700 performed, for example, by a network node, in accordance with the present disclosure. Example process 700 is an example where the network node (e.g., a UE 120 or a network node 615, among other examples) performs operations associated with sidelink resource reservation and selection.

As shown in FIG. 7, in some aspects, process 700 may include receiving information indicating a reservation or allocation of a resource for transmission of a first signal by another network node, wherein the information identifies whether the network node is to use the resource for transmission of a second signal concurrently with the first signal (block 710). For example, the network node (e.g., using communication manager 140/150 and/or reception component 902, depicted in FIG. 9) may receive information indicating a reservation or allocation of a resource for transmission of a first signal by another network node, wherein the information identifies whether the network node is to use the resource for transmission of a second signal concurrently with the first signal, as described above.

As further shown in FIG. 7, in some aspects, process 700 may include transmitting the second signal in the resource based at least in part on the information identifying whether the network node is to use the resource for transmission of the second signal (block 720). For example, the network node (e.g., using communication manager 140/150 and/or transmission component 904, depicted in FIG. 9) may transmit the second signal in the resource based at least in part on the information identifying whether the network node is to use the resource for transmission of the second signal, as described above.

Process 700 may include additional aspects, such as any single aspect or any combination of aspects described below and/or in connection with one or more other processes described elsewhere herein.

In a first aspect, the information identifies a demodulation reference signal configuration associated with the reservation or allocation of the resource, and transmitting the second signal comprises transmitting the second signal based at least in part on the demodulation reference signal configuration.

In a second aspect, alone or in combination with the first aspect, the network node reuses the resource for transmission of the second signal.

In a third aspect, alone or in combination with one or more of the first and second aspects, the information identifies, for a demodulation reference signal configuration associated with the first signal, at least one of a quantity of demodulation reference signal symbols, a demodulation reference signal type, or a location of a demodulation reference signal.

In a fourth aspect, alone or in combination with one or more of the first through third aspects, the information identifies at least one of a quantity of code division multiplexing groups, a quantity of ports for transmission using the resource, an index of a port for transmission using the resource, or an index of a port for reuse of the resource.

In a fifth aspect, alone or in combination with one or more of the first through fourth aspects, transmitting the second signal comprises transmitting the second signal using a second demodulation reference signal configuration that is different than a first demodulation reference signal configuration that is used for the first signal.

In a sixth aspect, alone or in combination with one or more of the first through fifth aspects, the second demodulation reference signal configuration is associated with at least a partial demodulation reference signal overlap with the first demodulation reference signal configuration.

In a seventh aspect, alone or in combination with one or more of the first through sixth aspects, the second demodulation reference signal configuration is associated with a different comb than is associated with the first demodulation reference signal configuration.

In an eighth aspect, alone or in combination with one or more of the first through seventh aspects, a demodulation reference signal sequence of the second demodulation reference signal configuration is initialized based at least in part on at least one of an initialization value received from a scheduling entity, a source identifier, a destination identifier, whether hybrid automatic repeat request feedback is enabled, a zone identifier, or a cast type.

In a ninth aspect, alone or in combination with one or more of the first through eighth aspects, a first orthogonal cover code of the first signal is different than a second orthogonal cover code of the second signal.

In a tenth aspect, alone or in combination with one or more of the first through ninth aspects, the second orthogonal cover code is based at least in part on the first orthogonal cover code.

In an eleventh aspect, alone or in combination with one or more of the first through tenth aspects, the second orthogonal cover code is based at least in part on an indication received from a scheduling entity.

In a twelfth aspect, alone or in combination with one or more of the first through eleventh aspects, the first orthogonal cover code and the second orthogonal cover code are frequency-domain orthogonal cover codes for physical sidelink control channel communications.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
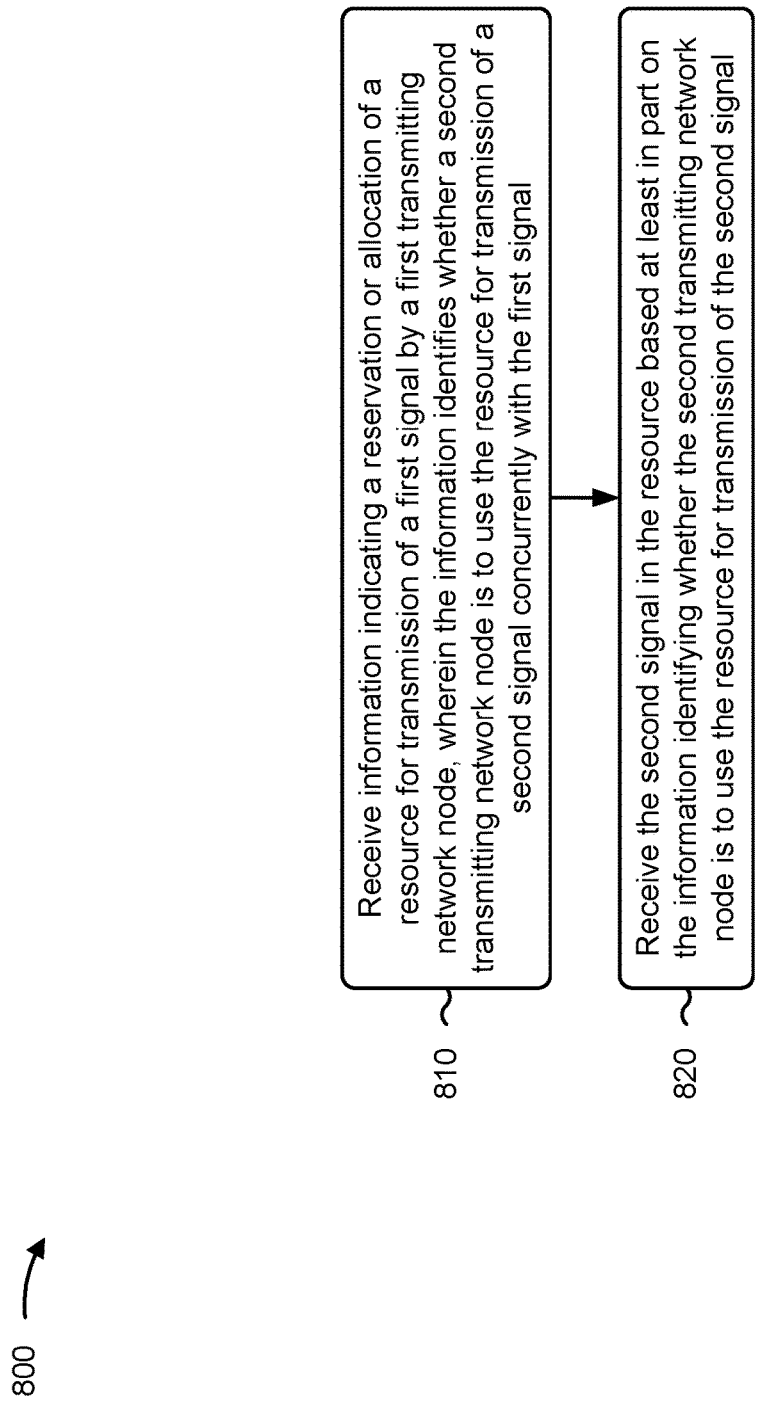

FIG. 8 is a diagram illustrating an example process 800 performed, for example, by a network node, in accordance with the present disclosure. Example process 800 is an example where the network node (e.g., a UE 120 or a network node 610) performs operations associated with sidelink resource reservation and selection.

As shown in FIG. 8, in some aspects, process 800 may include receiving information indicating a reservation or allocation of a resource for transmission of a first signal by a first transmitting network node, wherein the information identifies whether a second transmitting network node is to use the resource for transmission of a second signal concurrently with the first signal (block 810). For example, the network node (e.g., using communication manager 140 and/or reception component 1002, depicted in FIG. 10) may receive information indicating a reservation or allocation of a resource for transmission of a first signal by a first transmitting network node, wherein the information identifies whether a second transmitting network node is to use the resource for transmission of a second signal concurrently with the first signal, as described above.

As further shown in FIG. 8, in some aspects, process 800 may include receiving the second signal in the resource based at least in part on the information identifying whether the second transmitting network node is to use the resource for transmission of the second signal (block 820). For example, the network node (e.g., using communication manager 140 and/or reception component 1002, depicted in FIG. 10) may receive the second signal in the resource based at least in part on the information identifying whether the second transmitting network node is to use the resource for transmission of the second signal, as described above.

Process 800 may include additional aspects, such as any single aspect or any combination of aspects described below and/or in connection with one or more other processes described elsewhere herein.

In a first aspect, the information identifies a demodulation reference signal configuration associated with the reservation or allocation of the resource, and receiving the second signal comprises receiving the second signal based at least in part on the demodulation reference signal configuration.

In a second aspect, alone or in combination with the first aspect, the second transmitting network node reuses the resource for transmission of the second signal.

In a third aspect, alone or in combination with one or more of the first and second aspects, the information identifies, for a demodulation reference signal configuration associated with the first signal, at least one of a quantity of demodulation reference signal symbols, a demodulation reference signal type, or a location of a demodulation reference signal.

In a fourth aspect, alone or in combination with one or more of the first through third aspects, the information identifies at least one of a quantity of code division multiplexing groups, a quantity of ports for transmission using the resource, an index of a port for transmission using the resource, or an index of a port for reuse of the resource.

In a fifth aspect, alone or in combination with one or more of the first through fourth aspects, receiving the second signal comprises performing interference nulling based at least in part on a demodulation reference signal configuration.

In a sixth aspect, alone or in combination with one or more of the first through fifth aspects, receiving the second signal comprises performing interferer channel estimation in accordance with a rule defining one or more overlapping symbols associated with a first demodulation reference signal configuration of the first signal and a second demodulation reference signal configuration of the second signal.

In a seventh aspect, alone or in combination with one or more of the first through sixth aspects, a first orthogonal cover code of the first signal is different than a second orthogonal cover code of the second signal.

In an eighth aspect, alone or in combination with one or more of the first through seventh aspects, the first orthogonal cover code and the second orthogonal cover code are frequency-domain orthogonal cover codes for physical sidelink control channel communications.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
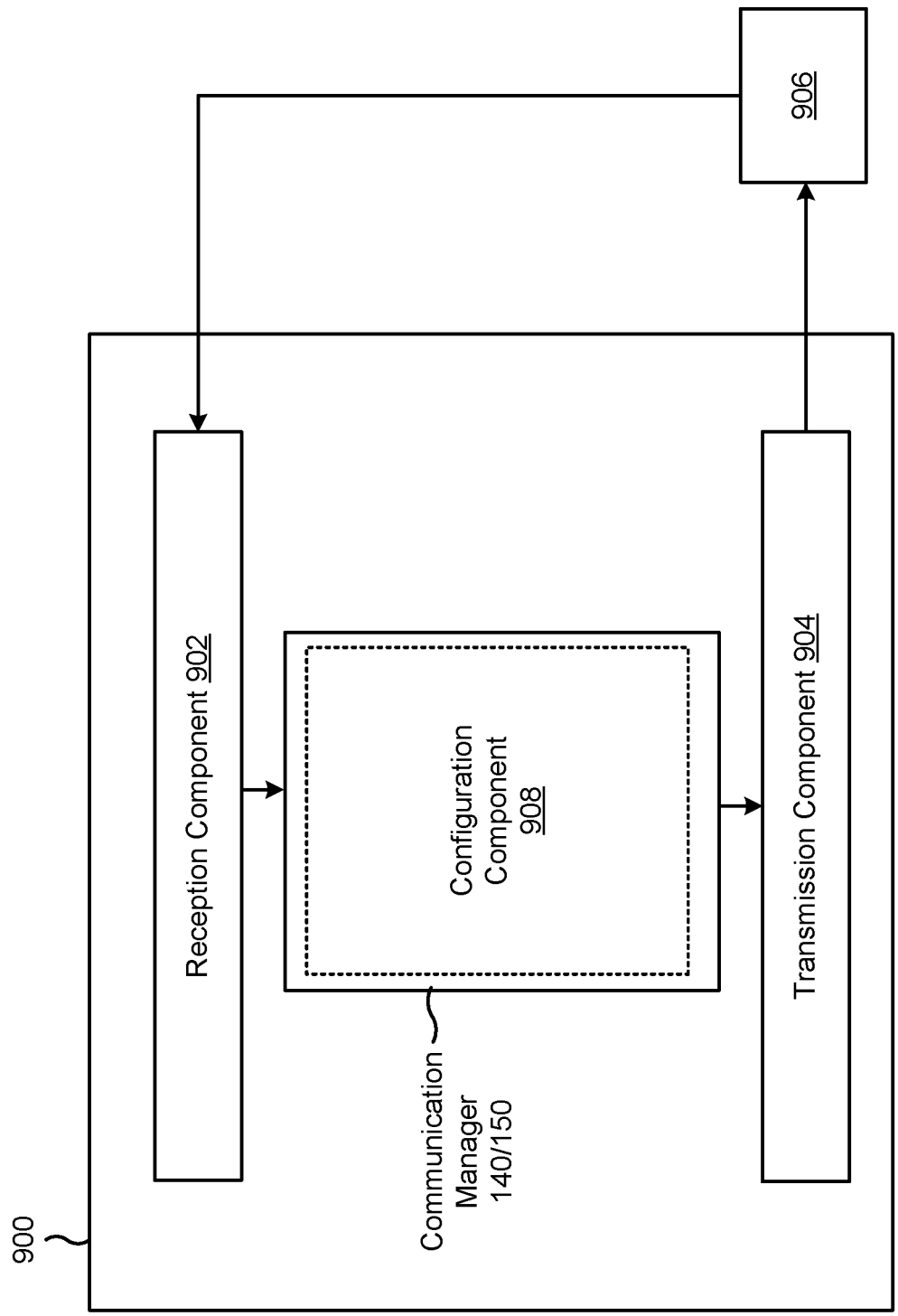
FIGS. 9-10 are diagrams of example apparatuses for wireless communication, in accordance with the present disclosure.

FIG. 9 is a diagram of an example apparatus 900 for wireless communication. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140/150. The communication manager 140/150) may include a configuration component 908, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The reception component 902 may receive information indicating a reservation or allocation of a resource for transmission of a first signal by another network node, wherein the information identifies whether the network node is to use the resource for transmission of a second signal concurrently with the first signal. The transmission component 904 may transmit the second signal in the resource based at least in part on the information identifying whether the network node is to use the resource for transmission of the second signal. The configuration component 908 may configure the transmission of the second signal.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
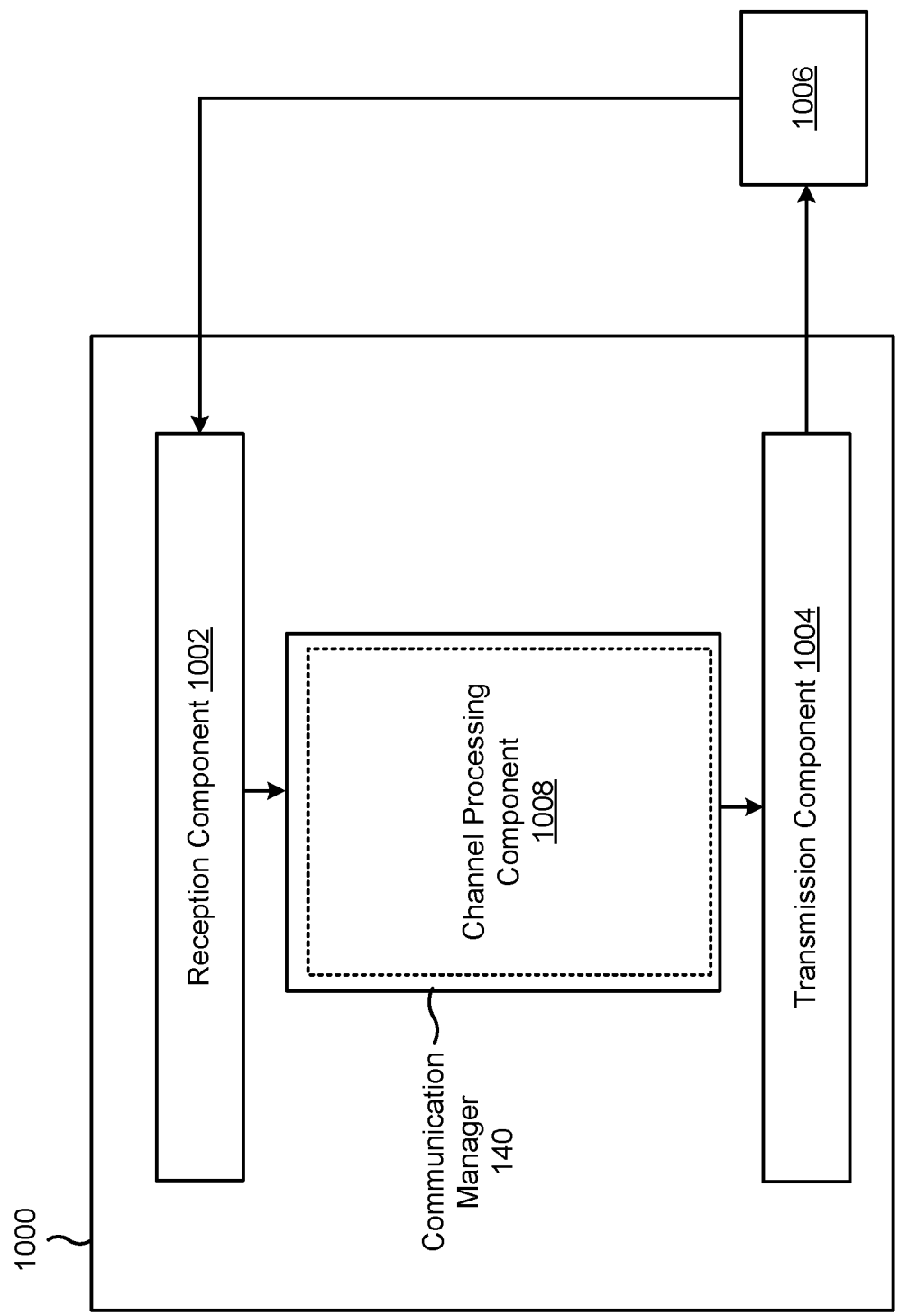

FIG. 10 is a diagram of an example apparatus 1000 for wireless communication. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a channel processing component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8 or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The reception component 1002 may receive information indicating a reservation or allocation of a resource for transmission of a first signal by a first transmitting network node, wherein the information identifies whether a second transmitting network node is to use the resource for transmission of a second signal concurrently with the first signal. The reception component 1002 may receive the second signal in the resource based at least in part on the information identifying whether the second transmitting network node is to use the resource for transmission of the second signal. The channel processing component 1008 may perform interference channel estimation and interference nulling on received signals.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a network node, comprising: receiving information indicating a reservation or allocation of a resource for transmission of a first signal by another network node, wherein the information identifies whether the network node is to use the resource for transmission of a second signal concurrently with the first signal; and transmitting the second signal in the resource based at least in part on the information identifying whether the network node is to use the resource for transmission of the second signal.

Aspect 2: The method of Aspect 1, wherein the information identifies a demodulation reference signal configuration associated with the reservation or allocation of the resource; and wherein transmitting the second signal comprises: transmitting the second signal based at least in part on the demodulation reference signal configuration.

Aspect 3: The method of any of Aspects 1 to 2, wherein the network node reuses the resource for transmission of the second signal.

Aspect 4: The method of any of Aspects 1 to 3, wherein the information identifies, for a demodulation reference signal configuration associated with the first signal, at least one of: a quantity of demodulation reference signal symbols, a demodulation reference signal type, or a location of a demodulation reference signal.

Aspect 5: The method of any of Aspects 1 to 4, wherein the information identifies at least one of: a quantity of code division multiplexing groups, a quantity of ports for transmission using the resource, an index of a port for transmission using the resource, or an index of a port for reuse of the resource.

Aspect 6: The method of any of Aspects 1 to 5, wherein transmitting the second signal comprises: transmitting the second signal using a second demodulation reference signal configuration that is different than a first demodulation reference signal configuration that is used for the first signal.

Aspect 7: The method of Aspect 6, wherein the second demodulation reference signal configuration is associated with at least a partial demodulation reference signal overlap with the first demodulation reference signal configuration.

Aspect 8: The method of any of Aspects 6 to 7, wherein the second demodulation reference signal configuration is associated with a different comb than is associated with the first demodulation reference signal configuration.

Aspect 9: The method of any of Aspects 6 to 8, wherein a demodulation reference signal sequence of the second demodulation reference signal configuration is initialized based at least in part on at least one of: an initialization value received from a scheduling entity, a source identifier, a destination identifier, or a cast type.

Aspect 10: The method of Aspect 1, wherein a first orthogonal cover code of the first signal is different than a second orthogonal cover code of the second signal.

Aspect 11: The method of Aspect 10, wherein the second orthogonal cover code is based at least in part on the first orthogonal cover code.

Aspect 12: The method of any of Aspects 10 to 11, wherein the second orthogonal cover code is based at least in part on an indication received from a scheduling entity.

Aspect 13: The method of any of Aspects 10 to 12, wherein the first orthogonal cover code and the second orthogonal cover code are frequency-domain orthogonal cover codes for physical sidelink control channel communications.

Aspect 14: A method of wireless communication performed by a network node, comprising: receiving information indicating a reservation or allocation of a resource for transmission of a first signal by a first transmitting network node, wherein the information identifies whether a second transmitting network node is to use the resource for transmission of a second signal concurrently with the first signal; and receiving the second signal in the resource based at least in part on the information identifying whether the second transmitting network node is to use the resource for transmission of the second signal.

Aspect 15: The method of Aspect 14, wherein the information identifies a demodulation reference signal configuration associated with the reservation or allocation of the resource; and wherein receiving the second signal comprises: receiving the second signal based at least in part on the demodulation reference signal configuration.

Aspect 16: The method of any of Aspects 14 to 15, wherein the second transmitting network node reuses the resource for transmission of the second signal.

Aspect 17: The method of any of Aspects 14 to 16, wherein the information identifies, for a demodulation reference signal configuration associated with the first signal, at least one of: a quantity of demodulation reference signal symbols, a demodulation reference signal type, or a location of a demodulation reference signal.

Aspect 18: The method of any of Aspects 14 to 17, wherein the information identifies at least one of: a quantity of code division multiplexing groups, a quantity of ports for transmission using the resource, an index of a port for transmission using the resource, or an index of a port for reuse of the resource.

Aspect 19: The method of any of Aspects 14 to 18, wherein receiving the second signal comprises: performing interference nulling based at least in part on a demodulation reference signal configuration.

Aspect 20: The method of any of Aspects 14 to 19, wherein receiving the second signal comprises: performing interferer channel estimation in accordance with a rule defining one or more overlapping symbols associated with a first demodulation reference signal configuration of the first signal and a second demodulation reference signal configuration of the second signal.

Aspect 21: The method of any of Aspects 14 to 20, wherein a first orthogonal cover code of the first signal is different than a second orthogonal cover code of the second signal.

Aspect 22: The method of Aspect 21, wherein the first orthogonal cover code and the second orthogonal cover code are frequency-domain orthogonal cover codes for physical sidelink control channel communications.

Aspect 23: An apparatus for wireless communication at a device, comprising a processor; memory coupled with the processor; and instructions stored in the memory and executable by the processor to cause the apparatus to perform the method of one or more of Aspects 1-13.

Aspect 24: A device for wireless communication, comprising a memory and one or more processors coupled to the memory, the one or more processors configured to perform the method of one or more of Aspects 1-13.

Aspect 25: An apparatus for wireless communication, comprising at least one means for performing the method of one or more of Aspects 1-13.

Aspect 26: A non-transitory computer-readable medium storing code for wireless communication, the code comprising instructions executable by a processor to perform the method of one or more of Aspects 1-13.

Aspect 27: A non-transitory computer-readable medium storing a set of instructions for wireless communication, the set of instructions comprising one or more instructions that, when executed by one or more processors of a device, cause the device to perform the method of one or more of Aspects 1-13.

Aspect 28: An apparatus for wireless communication at a device, comprising a processor; memory coupled with the processor; and instructions stored in the memory and executable by the processor to cause the apparatus to perform the method of one or more of Aspects 14-22.

Aspect 29: A device for wireless communication, comprising a memory and one or more processors coupled to the memory, the one or more processors configured to perform the method of one or more of Aspects 14-22.

Aspect 30: An apparatus for wireless communication, comprising at least one means for performing the method of one or more of Aspects 14-22.

Aspect 31: A non-transitory computer-readable medium storing code for wireless communication, the code comprising instructions executable by a processor to perform the method of one or more of Aspects 14-22.

Aspect 32: A non-transitory computer-readable medium storing a set of instructions for wireless communication, the set of instructions comprising one or more instructions that, when executed by one or more processors of a device, cause the device to perform the method of one or more of Aspects 14-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive, from another UE, information identifying a first demodulation reference signal (DMRS) pattern associated with a reservation or allocation of a resource for transmission of a first signal by the other UE, wherein the information identifies whether the UE is to use the resource for transmission of a second signal concurrently with the first signal; and
      transmit, to a network node different from the UE and the other UE, the second signal in the resource,
         wherein the second signal is transmitted using the first DMRS pattern or a second DMRS pattern, associated with the resource, based at least in part on the information identifying whether the UE is to use the resource for transmission of the second signal.

2. The UE of claim 1, wherein the UE reuses the resource for transmission of the second signal.

3. The UE of claim 1, wherein the information identifies, for the first DMRS pattern, at least one of:
   a quantity of DMRS symbols,
   a DMRS type, or
   a location of a DMRS within a resource allocation.

4. The UE of claim 1, wherein the information, for the first DMRS pattern, identifies at least one of:
   a quantity of code division multiplexing groups,
   a quantity of ports for transmission using the resource,
   an index of a port for transmission using the resource, or
   an index of a port for reuse of the resource.

5. The UE of claim 1, wherein the one or more processors, to transmit the second signal in the resource, are configured to:
   transmit the second signal in the resource using the second DMRS pattern.

6. The UE of claim 5, wherein the second DMRS pattern is associated with a partial DMRS overlap with the first DMRS pattern.

7. The UE of claim 5, wherein the second DMRS pattern is associated with a different comb than is associated with the first DMRS pattern.

8. The UE of claim 5, wherein a DMRS sequence of the second DMRS pattern is initialized based at least in part on at least one of:
   an initialization value received from a scheduling entity,
   a source identifier,
   a destination identifier, whether hybrid automatic repeat request feedback is enabled,
a zone identifier, or
a cast type.

9. The UE of claim 5, wherein the second DMRS pattern is associated with a full DMRS overlap with the first DMRS pattern.

10. The UE of claim 1, wherein a first orthogonal cover code of the first signal is different than a second orthogonal cover code of the second signal.

11. The UE of claim 10, wherein the second orthogonal cover code is based at least in part on the first orthogonal cover code.

12. The UE of claim 10, wherein the second orthogonal cover code is based at least in part on an indication received from a scheduling entity.

13. The UE of claim 10, wherein the first orthogonal cover code and the second orthogonal cover code are frequency domain orthogonal cover codes for physical sidelink control channel communications.

14. A method of wireless communication performed by a user equipment (UE), comprising:
receiving, from another UE, information identifying a first demodulation reference signal (DMRS) pattern associated with a reservation or allocation of a resource for transmission of a first signal by the other UE, wherein the information identifies whether the UE is to use the resource for transmission of a second signal concurrently with the first signal; and
transmitting, to a network node different from the UE and the other UE, the second signal in the resource,
wherein the second signal is transmitted using the first DMRS pattern or a second DMRS pattern, associated with the resource, based at least in part on the information identifying whether the UE is to use the resource for transmission of the second signal.

15. The method of claim 14, wherein the UE reuses the resource for transmission of the second signal.

16. The method of claim 14, wherein the information identifies, for the first DMRS pattern, at least one of:
a quantity of DMRS symbols,
a DMRS type, or
a location of a DMRS within a resource allocation.

17. The method of claim 14, wherein the information identifies, for the first DMRS pattern, at least one of:
a quantity of code division multiplexing groups,
a quantity of ports for transmission using the resource,
an index of a port for transmission using the resource, or
an index of a port for reuse of the resource.

18. The method of claim 14, wherein transmitting the second signal in the resource comprises:
transmitting the second signal in the resource using the second DMRS pattern.

19. The method of claim 14, wherein the second DMRS pattern is associated with at least a partial DMRS overlap with the first DMRS pattern.

20. A non-transitory computer-readable medium storing a set of instructions for wireless communication, the set of instructions comprising:
one or more instructions that, when executed by one or more processors of a user equipment (UE), cause the UE to:
receive, from another UE, information identifying a first demodulation reference signal (DMRS) pattern associated with a reservation or allocation of a resource for transmission of a first signal by the other UE, wherein the information identifies whether the UE is to use the resource for transmission of a second signal concurrently with the first signal; and
transmit, to a network node different from the UE and the other UE, the second signal in the resource,
wherein the second signal is transmitted using the first DMRS pattern or a second DMRS pattern, associated with the resource, based at least in part on the information identifying whether the UE is to use the resource for transmission of the second signal.

21. The non-transitory computer-readable medium of claim 20, wherein the UE reuses the resource for transmission of the second signal.

22. The non-transitory computer-readable medium of claim 20, wherein the information identifies, for the first DMRS pattern, at least one of:
a quantity of DMRS symbols,
a DMRS type, or
a location of a DMRS within a resource allocation.

23. The non-transitory computer-readable medium of claim 20, wherein the information, for the first DMRS pattern, identifies at least one of:
a quantity of code division multiplexing groups,
a quantity of ports for transmission using the resource,
an index of a port for transmission using the resource, or
an index of a port for reuse of the resource.

24. The non-transitory computer-readable medium of claim 20, wherein the one or more instructions, that cause the UE to transmit the second signal in the resource, cause the UE to:
transmit the second signal in the resource using the second DMRS pattern.

25. The non-transitory computer-readable medium of claim 20, wherein a first orthogonal cover code of the first signal is different than a second orthogonal cover code of the second signal.

26. The non-transitory computer-readable medium of claim 20, wherein the second DMRS pattern is associated with at least a partial DMRS overlap with the first DMRS pattern.

27. An apparatus for wireless communication, comprising:
means for receiving, from a user equipment (UE) information identifying a first demodulation reference signal (DMRS) pattern associated with a reservation or allocation of a resource for transmission of a first signal by the UE, wherein the information identifies whether the apparatus is to use the resource for transmission of a second signal concurrently with the first signal; and
means for transmitting, to a network node different from the apparatus and the UE, the second signal in the resource,
wherein the second signal is transmitted using the first DMRS pattern or a second DMRS pattern, associated with the resource, based at least in part on the information identifying whether the apparatus is to use the resource for transmission of the second signal.

28. The apparatus of claim 27, wherein the apparatus reuses the resource for transmission of the second signal.

29. The apparatus of claim 27, wherein the means for transmitting the second signal in the resource are configured to:
means for transmitting the second signal in the resource using the second DMRS pattern.

30. The apparatus of claim 29, wherein the second DMRS pattern is associated with at least a partial DMRS overlap with the first DMRS pattern.

\* \* \* \* \*